United States Patent [19]
Cox

[11] Patent Number: 6,083,397
[45] Date of Patent: *Jul. 4, 2000

[54] CLIP FOR THE SUPPORT OF A DROPLINE IN AN AERATED WASTEWATER TREATMENT TANK

[75] Inventor: Christopher E. Cox, Denham Springs, La.

[73] Assignee: Delta Environmental Products, Inc., Denham Springs, La.

[*] Notice: This patent is subject to a terminal disclaimer.

[21] Appl. No.: 09/264,093

[22] Filed: Mar. 8, 1999

Related U.S. Application Data

[63] Continuation-in-part of application No. 09/007,620, Jan. 15, 1998, Pat. No. 5,879,550, which is a continuation-in-part of application No. 08/702,969, Aug. 26, 1996, abandoned.

[51] Int. Cl.$^7$ .................................................. C02F 3/20
[52] U.S. Cl. ...................... 210/620; 210/626; 210/195.4; 210/197; 210/220; 210/256; 210/541
[58] Field of Search .............................. 210/195.3, 195.4, 210/197, 220, 256, 258, 259, 532.1, 541, 542, 620, 623, 626; 248/65, 58, 62, 7.1, 74.1, 75, 309.1, 315, 300, 68.1, 174, 74.2, 76, 79, 89

[56] References Cited

U.S. PATENT DOCUMENTS

| | | |
|---|---|---|
| 1,066,706 | 7/1913 | Caine . |
| 2,638,643 | 5/1953 | Olson .......................................... 20/92 |
| 3,189,305 | 6/1965 | Willenborg ................................. 248/74 |
| 3,363,864 | 1/1968 | Olgreen ...................................... 248/68 |
| 4,009,106 | 2/1977 | Smith ...................................... 210/195 |
| 4,408,742 | 10/1983 | Korb ........................................ 248/74 |
| 4,572,695 | 2/1986 | Gilb .................................... 403/232.1 |
| 4,650,577 | 3/1987 | Hansel ................................... 210/195.3 |
| 4,700,737 | 10/1987 | Nelson .............................. 137/355.27 |
| 4,983,285 | 1/1991 | Nolen ..................................... 210/197 |
| 5,221,470 | 6/1993 | McKinney ............................. 210/151 |
| 5,490,935 | 2/1996 | Guy ........................................ 210/620 |

*Primary Examiner*—Christopher Upton
*Attorney, Agent, or Firm*—Roy, Kiesel & Tucker

[57] ABSTRACT

A clip for supporting the clarifier and the droplines in a wastewater treatment system is disclosed. The clip comprises a pair of parallel main plates separated by a bracing plate. The bracing plate is perpendicular to the main plates and is attached to the ends of each. Attached to the free ends of each of the main plates is a pair of mounting plates. These mounting plates are parallel to the bracing plate. In a preferred embodiment, the main plates each contain a hole. This pair of holes is vertically aligned, and each hole is sized to contain a dropline.

32 Claims, 5 Drawing Sheets

CLIP FOR THE SUPPORT OF A DROPLINE IN AN AERATED WASTEWATER TREATMENT TANK

CONTINUATION-IN-PART

This is a continuation-in-part of U.S. patent application Ser. No. 09/007,620, filed Jan. 18,1998 now U.S. Pat. No. 5,879,550, which was a continuation-in-part of U.S. patent application Ser. No. 08/702,969, filed Aug. 26, 1996, now abandoned, the contents of which are hereby incorporated by reference in their entirety.

BACKGROUND OF THE INVENTION

Prior Art

The invention relates generally to clips used in wastewater treatment tanks, such as that disclosed in U.S. Pat. No. 5,490,935, having a central conical clarifier and a plurality of droplines encircling the clarifier. In such systems, compressed air is generally pumped through the droplines and into the wastewater in the tank in order to foster the growth of aerobic bacteria.

The conical clarifier usually has a lip at its upper edge. This lip rests on a series of brackets placed on the tank walls. A typical bracket used is an L-bracket. The L-bracket consists of two plates whose ends meet at right angles, so that when viewed from the side, the shape resembles the letter L. One plate is attached to the tank walls so that the other plate extends perpendicularly from the walls. The lip rests on the plate extending from the wall.

The droplines in such a system generally extend from a circular feeder, although other configurations are used. The feeder is a pipe ring which is connected to a pressure source. The entire piping system is frequently comprised of ½ to ¾ inch PVC pipe. The droplines, piping with one or more openings near the end, are fluidly connected to the feeder so that when compressed air is pumped into the feeder, it will be emitted from the droplines.

The feeder rests on the L-bracket between the wall and the clarifier lip. The L-bracket contains a hole which is sized to fit a dropline, so that the droplines extend down through an L-bracket to near the bottom of the tank. Pumping air through the droplines causes them to oscillate much like an untended garden hose. This oscillation can cause damage to the droplines and to the fittings which connect the droplines to the circular feeder.

In order to prevent oscillation, the pipe ends are held to the tank walls with a retainer. This retainer comprises a semi-circular ring which fits around the pipe and holds it in place. A problem arises with this retainer because it must be attached to the tank wall below the water line. This often entails using screws or bolts which pass through the tank wall, creating a potential leak. Welding the retainer to the wall can also create a weak spot in the tank wall which can potentially lead to a leak. If adhesives are used to attach the fitting to the tank wall, there is a risk that, over time, the adhesive will give way and allow the dropline to oscillate and potentially damage the system.

OBJECTS OF THE INVENTION

It is an object of the invention to provide a clip for supporting the clarifier in a wastewater treatment system.

It is another object of the invention to provide a clip for supporting the droplines and the feeder in a wastewater treatment system.

It is another object of the invention to prevent the droplines from oscillating.

It is yet another object of the invention to reduce the likelihood that the wastewater system will leak.

SUMMARY OF THE INVENTION

A clip for supporting the clarifier and the droplines in a wastewater treatment system is disclosed. The clip comprises a pair of parallel main plates separated by a bracing plate. The bracing plate is perpendicular to the main plates and is attached to the ends of each. Attached to the free ends of each of the main plates is a pair of mounting plates. These mounting plates are parallel to the bracing plate. In a preferred embodiment, the main plates each contain a hole. This pair of holes is vertically aligned, and each hole is sized to contain a dropline. In an alternate embodiment, the function of the holes may be accomplished using a pair of vertically aligned rings extending from and parallel to the main plates.

The clip should be positioned so that the main plates are substantially parallel to the water level in the tank. At least the first mounting plate should be attached above the water level. This first mounting plate may be bolted, riveted or otherwise attached to the tank wall without creating a potential leak. The second mounting plate will rest against the tank wall. It may be attached to the wall if desired; however, the second mounting plate need not be attached.

The first main plate will support the lip of the clarifier. In a preferred embodiment, the lip may be bolted or otherwise attached to the first main plate. The circular feeder will rest on the first main plate either between the lip of the clarifier and the tank wall or on top of the lip. The droplines will extend from the circular feeder through the paired holes contained in the main plates.

A means for receiving cable ties or other tying instruments such as cord or wire may be provided on the first main plate. These means may include rings, loops, hooks or eyelets attached to the first main plate or holes in the first main plate. Another means which may be convenient to manufacture would be a stamped protuberance in the first main plate. Removing the ends of this protuberance so as to provide passage through the protuberance would create a means for receiving tying instruments. These tying instruments may be used to secure the circular feeder to the first main plate.

The holes in the main plates fit the droplines closely. The main plates hold the droplines and prevent oscillation. The distance which the main plates should be separated depends upon the length and flexibility of the droplines and the pressure of the air pumped through the lines. The greater the separation, the more rigid each dropline will become. The inventor has found that a 5.5 inch separation works well in a system having three to eight ¾ inch schedule 40 PVC droplines, approximately five feet long each, and using compressed air at about 1.5 to 3 pounds per square inch (p.s.i.).

In another embodiment, a support plate is attached to the free end of the first mounting plate. This support plate is substantially perpendicular to the first mounting plate and extends away from the bracing plate. The support plate will rest on top of the tank wall when the first mounting plate is adjacent to the tank wall. The tank top will hold the support plate in place. In a preferred embodiment, the support plate may be attached to the tank wall with screws or bolts or other conventional attachment instruments. It is anticipated that this embodiment will be most useful in concrete tanks because of the thickness of the walls of such tanks.

DETAILED DESCRIPTION OF THE PREFERRED EMBODIMENTS

Illustrations of preferred construction, design, and methods of operation of the invention are set forth below with specific references to the Figure. However, it is not the intention of the inventor that the scope of his invention be limited to these preferred embodiments.

Figure 1:
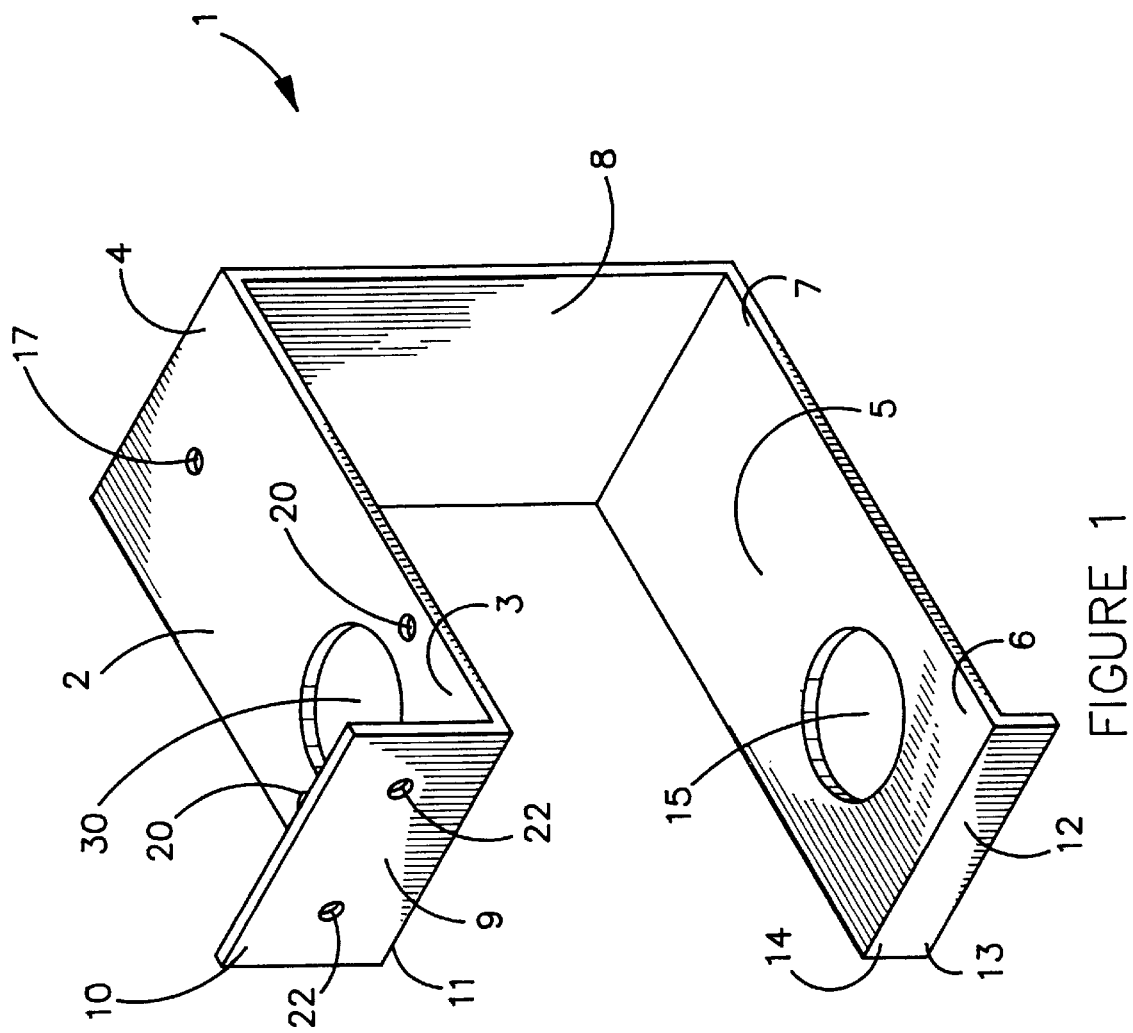
FIG. 1 is a depiction of a clip.

FIG. 1 depicts a clip 1. Clip 1 comprises a first main plate 2 having a first end 3 and a second end 4. Clip 1 also comprises a second main plate 5 having a first end 6 and a second end 7. First main plate 2 and second main plate 5 are substantially parallel and are connected by a bracing plate 8. Bracing plate 8 is substantially perpendicular to first main plate 2 and second main plate 5 and is attached to second end 4 of first main plate 2 and second end 7 of second main plate 5.

Clip 1 also comprises a first mounting plate 9 having a first end 10 and a second end 11. Second end 11 of first mounting plate 9 is attached to first end 3 of first main plate 2. First mounting plate 9 is substantially perpendicular to first main plate 2. Clip 1 also comprises a second mounting plate 12 having a first end 13 and a second end 14. Second end 14 of second mounting plate 12 is attached to first end 6 of second main plate 5. Second mounting plate 12 is substantially perpendicular to second main plate 5.

Figure 3:
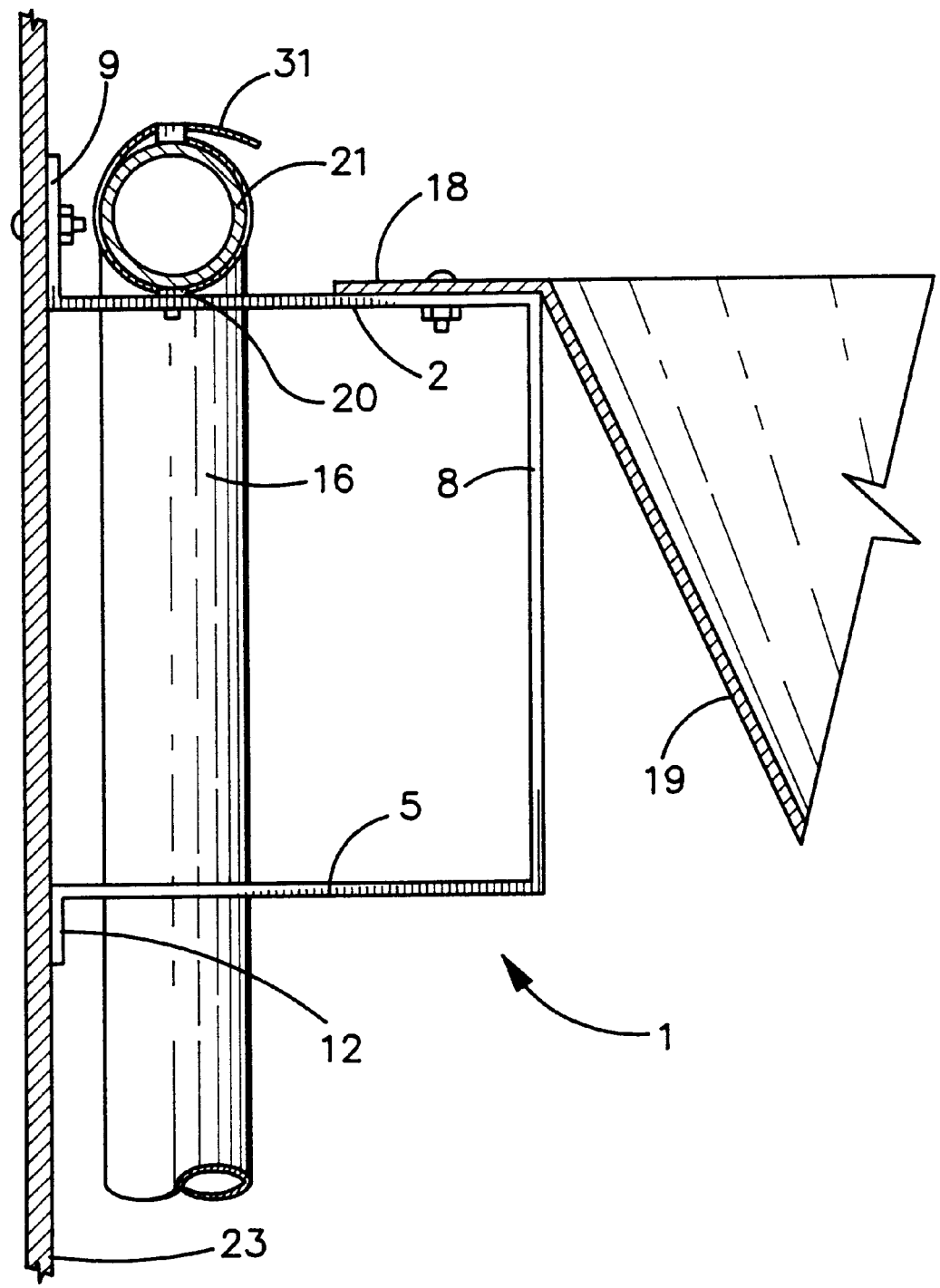
FIG. 3 is a depiction of cross sectional view of an aerobic wastewater treatment system having a clarifier and droplines supported by a clip.

In a preferred embodiment, first main plate 2 contains a first dropline aperture 30 and second main plate 5 contains a second dropline aperture 15. First and second dropline apertures 30 and 15 are sized to receive droplines 16, as depicted in FIG. 3. First and second dropline apertures 30 and 15 should be substantially aligned.

In another preferred embodiment, first main plate 2 is provided with a hole 17 near second end 4. Lip 18 of clarifier 19 may be secured to clip 1 using a bolt or screw and hole 17 or a rivet or other conventional attachment means. More than one hole 17 may be provided if desired.

In another preferred embodiment, first main plate 2 contains a means for receiving tying instruments 20 such as cable ties 31, cord or wire. This means for receiving tying instruments 20 may include rings, loops, hooks or eyelets attached to first main plate 2 or holes in first main plate 2. Another means for receiving tying instruments 20 which may be convenient to manufacture would be a stamped protuberance in first main plate 2. Removing the ends of this protuberance so as to provide passage through the protuberance would form a means for receiving tying instruments 20. These tying elements may be used to secure the circular feeder 21 to the first main plate 2.

In another preferred embodiment, first mounting plate 9 contains one or more holes 22. First mounting plate 9 may be secured to tank walls 23 using bolts or screw and holes 22. Holes 22 should be sized to fit the appropriate attachment hardware.

Figure 2:
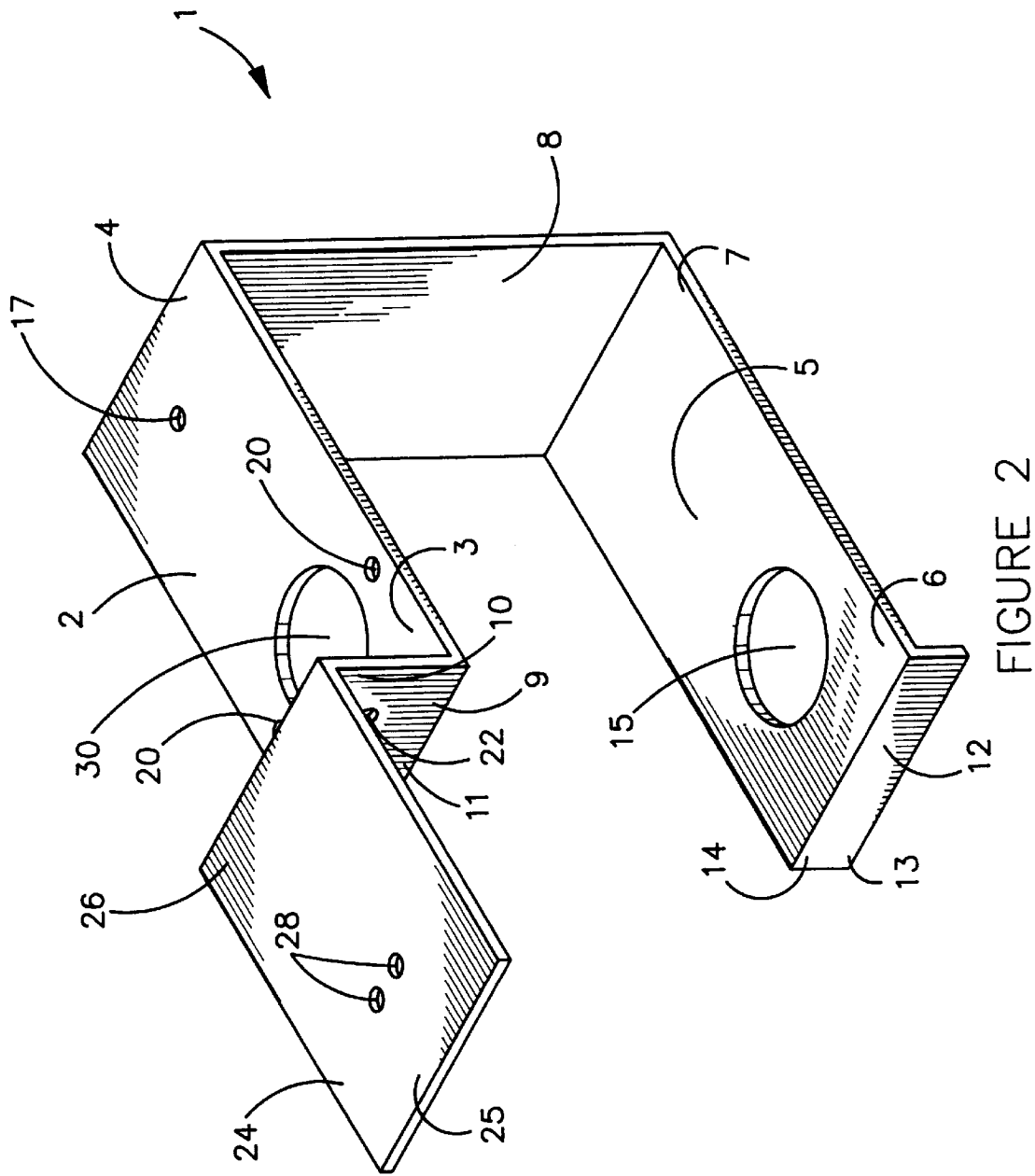
FIG. 2 is a depiction of a clip with a support plate.

In another preferred embodiment clip 1 also comprises a support plate 24 having a first end 25 and a second end 26, as shown in FIG. 2. Second end 26 of support plate 24 is attached to first end 10 of first mounting plate 9. Support plate 24 is substantially perpendicular to first mounting plate 9 and extends away from bracing plate 8. When first mounting plate 9 is flush against tank walls 23, support plate 24 will rest on top of tank walls 23. The tank top will rest on top of tank walls 23 and hold support plate 24 in place. Support plate 24 may contain one or more holes 28 to facilitate attachment of support plate 24 to tank walls 23.

In operation, as shown in FIG. 3, clip 1 will be attached to tank walls 23. First and second main plates 2 and 5 should be substantially parallel to the water level in tank. First mounting plate 9 should be attached above the water level. Lip 18 of clarifier 19 will rest on first main plate 2. Circular feeder 21 will rest on first main plate 2 between lip 18 and tank walls 23. Dropline 16 will extend downward through first and second dropline apertures 30 and 15. First main plate 2 and second main plate 5 will hold dropline 16 and prevent it from oscillating.

Figure 4:
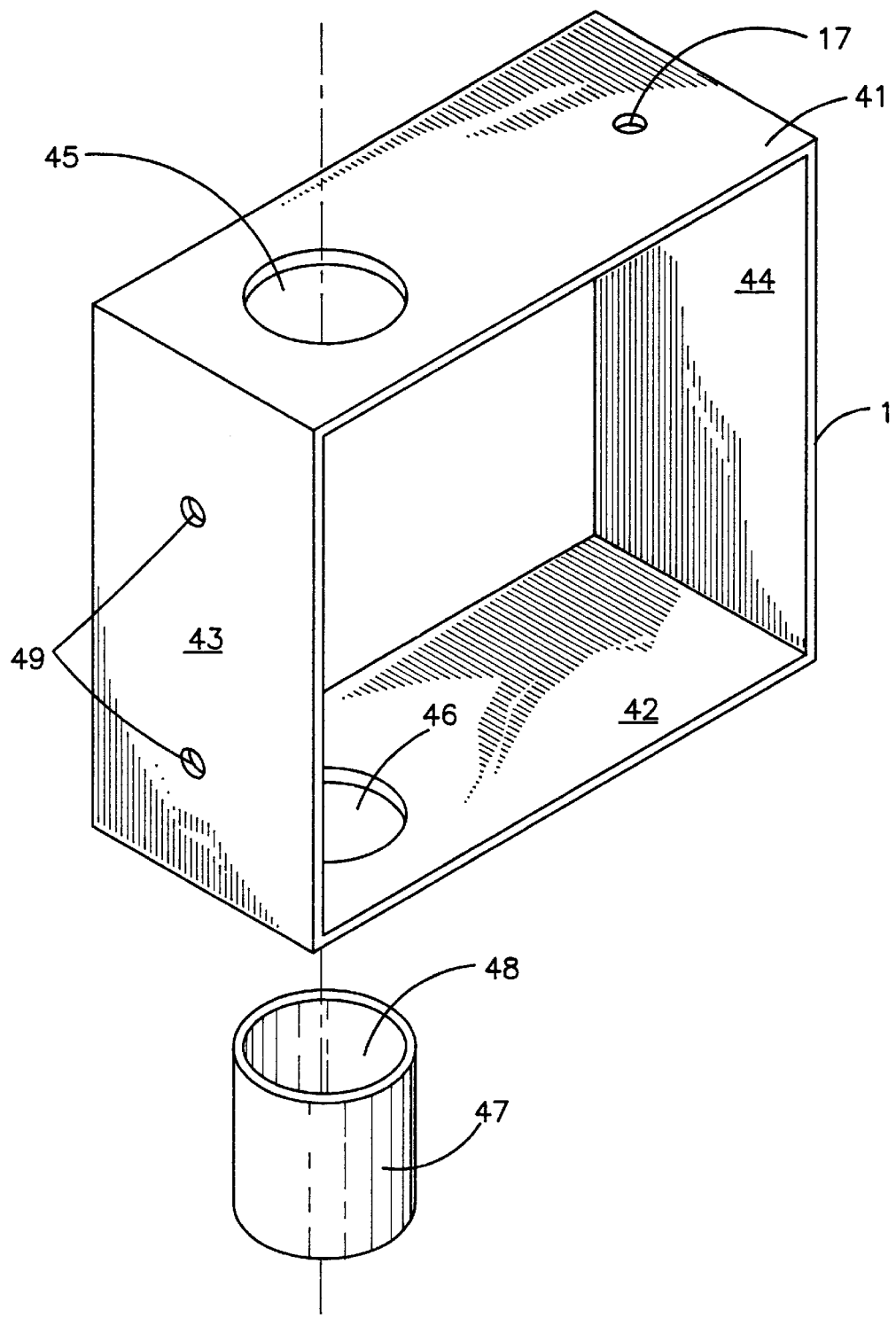
FIG. 4 is a depiction of a clip having an upper wall, a lower wall and sidewalls.
Figure 5:
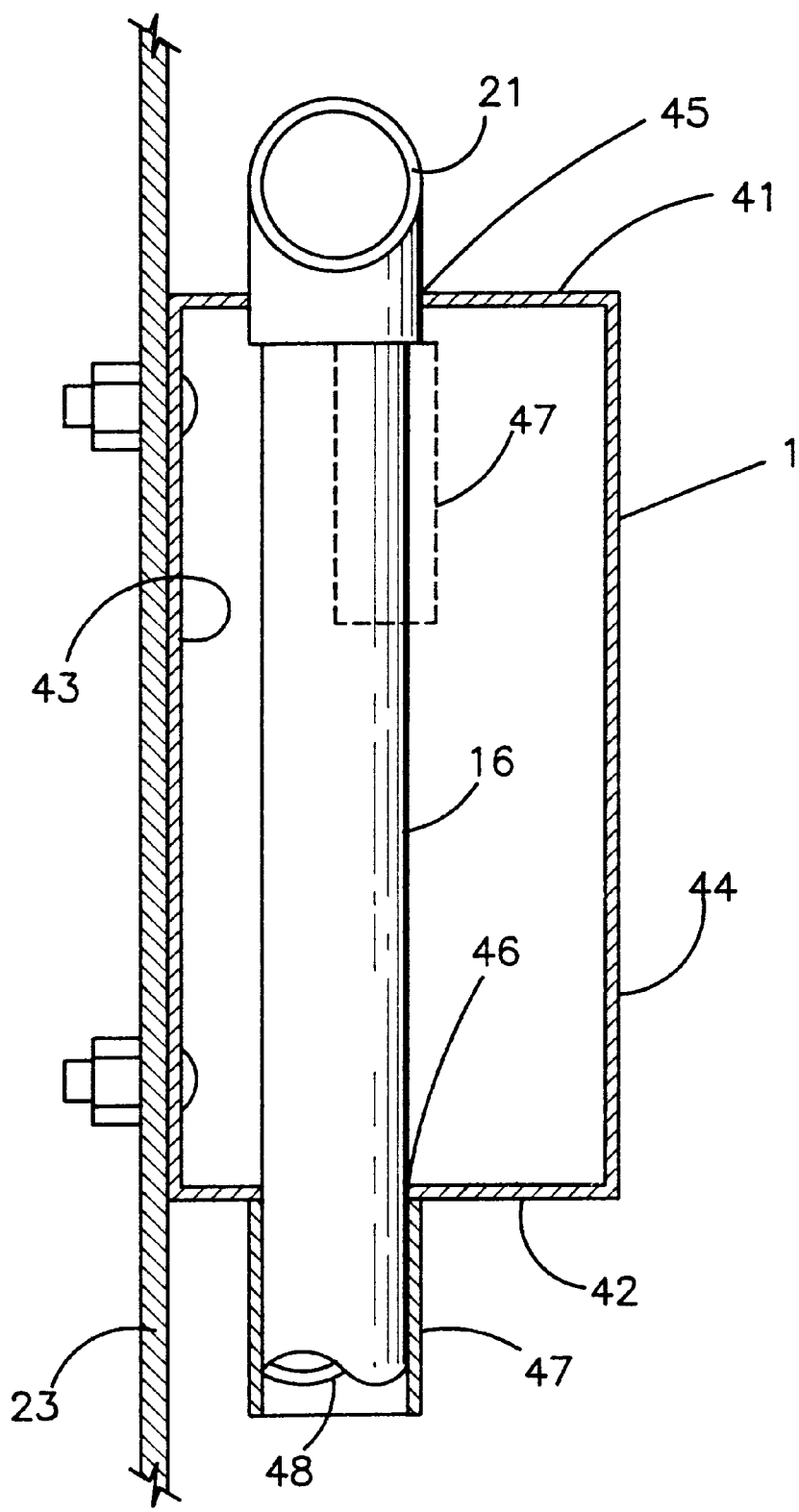
FIG. 5 is a depiction of a cross sectional view of an aerobic wastewater treatment system having a clarifier and droplines support by a clip having an upper wall, a lower wall and sidewalls.

Another embodiment of the invention is shown in FIGS. 4 and 5. Clip 1 comprises an upper wall 41, a lower wall 42, and at least one sidewall 43 extending between upper wall 41 and lower wall 42, although two sidewalls 43, 44 positioned at opposite ends of upper and lower walls 41, 42 and extending between upper wall 41 and lower wall 42 are preferred. Upper wall 41 is configured to have a first dropline aperture 45 therein, and lower wall 42 is configured to have a second dropline aperture 46 therein. Preferably first and second dropline apertures 45, 46 are substantially vertically aligned so that a dropline 16 may pass through clip 1 and so that clip 1 may secure dropline 16. Sidewall 43 is mountable to tank wall 23 using mounting apertures 49 so that upper wall 41 is substantially horizontally positioned. Upper wall 41 may also contain a means for receiving a tying instrument as previously described.

A stopper 47 is positioned, preferably fixedly, at least partly around dropline 16 to prevent upward displacement of dropline 16 as shown in the dashed portion of FIG. 5. Alternatively, stopper 47 fits completely around dropline 16 and configured to have a stopper aperture 48 therein so that dropline 16 passes through stopper 47. Stopper aperture 48 allows stopper 47 to be vertically positionable on dropline 16, as best seen in the lower, non-dashed stopper 47 in FIG. 5. In either embodiment, stopper 47 is vertically positioned on dropline 16 below second dropline aperture (shown in the lower portion of FIG. 5) or between first and second dropline apertures 45, 46 (shown in the dashed portion of FIG. 5). Stopper 47 is sized to be larger than first and second dropline apertures 45, 46 so that stopper 47 will not pass through apertures 45, 46, depending on the positioning of stopper 47.

In an embodiment of the invention where droplines 16 are constructed from ¾-inch pipe, apertures 45, 46 are configured to be slightly larger than droplines 16, while a ¾-inch polyvinyl chloride (PVC) coupler may be used as stopper 47. Stopper 47 may comprise other devices or attachments as long as they prevent upward displacement of droplines 16.

Upper walls 41 may be configured so that clips 1 may support clarifier lip 18 via hole 17 as previously described. The inventor contemplates that this invention may be used with wastewater tank embodiments in which clarifier 19 is not supported by clips 1. In such embodiments, clips 1 are constructed without hole 17 as shown in FIG. 5.

The scope of this invention is intended to include a solid block embodiment of clip 1. In such an embodiment, the upper surface of the block forms upper wall 41, and the lower surface of the block forms lower wall 42. The areas between upper and lower walls 41, 42 form sidewalls 43, 44 regardless of whether sidewalls 43, 44 are flat or slightly rounded.

Droplines 16 are mounted within the wastewater treatment system by sliding droplines 16 through first and second dropline apertures 45, 46 of clip 1. Clip 1 is mounted to tank wall 23 via mounting apertures 49 using bolts, screws or other means well known in the art for securing two objects. Stopper 47 is positioned along dropline 16 to prevent upward displacement of dropline 16.

Other uses and embodiments of the invention will occur to those skilled in the art, and are intended to be included within the scope and spirit of the following claims.

I claim:

1. In an aerated wastewater treatment tank having a top, a bottom, and tank walls extending therebetween, said tank further comprising a clarifier positioned within said tank, said clarifier having a wide end and a narrow end, and a plurality of substantially vertical droplines extending downwardly into said tank between said clarifier and said tank walls wherein the improvement comprises:
    a plurality of clips, each said clip comprising:
        (a) an upper wall comprising a first dropline aperture;
        (b) a lower wall comprising a second dropline aperture;
        (c) at least one sidewall extending between said upper wall and said lower wall, each said sidewall substantially perpendicular to said upper wall and said lower wall, at least one of said sidewalls is mountable to said tank wall;
    wherein said clips are mounted to said tank walls so that said upper walls of said plurality of clips are substantially horizontally positioned.

2. An aerated wastewater treatment tank according to claim 1 wherein said clip is mounted to said tank walls so that said first and second dropline apertures are substantially vertically aligned, whereby said dropline apertures may secure a dropline.

3. An aerated wastewater treatment tank according to claim 1 wherein said upper wall contains a means for receiving tying instruments.

4. An aerated wastewater treatment tank according to claim 1 further comprising a stopper, said stopper configured to have a stopper dropline aperture therein, said stopper fixedly positioned on at least one of said droplines to prevent upward displacement of said droplines.

5. An aerated wastewater treatment tank according to claim 4 wherein said stopper is positioned on said dropline below said second dropline aperture.

6. An aerated wastewater treatment tank according to claim 4 wherein said stopper is positioned between said first and second dropline apertures.

7. An aerated wastewater treatment tank according to claim 4 wherein said stopper is sized so that it will not pass through said second dropline aperture.

8. An aerated wastewater treatment tank according to claim 1 further comprising a stopper, said stopper configured to be positioned at least partially around said dropline, said stopper positioned around said drop line to prevent upward displacement of said droplines.

9. An aerated wastewater treatment tank according to claim 8 wherein said stopper is positioned between said first and second dropline apertures.

10. An aerated wastewater treatment tank according to claim 9 wherein said sidewalls are positioned at opposite ends of said upper wall and said lower wall.

11. An aerated wastewater treatment tank according to claim 8 wherein said stopper is sized so that it will not pass through said second dropline aperture.

12. An aerated wastewater treatment tank according to claim 1 wherein said clip comprises at least two sidewalls.

13. An aerated wastewater treatment tank according to claim 1 wherein said clarifier has a lip extending from said wide end, whereby said upper walls of said clips may support said clarifier lip.

14. In an aerated wastewater treatment tank having a top, a bottom, and tank walls extending therebetween, said tank further comprising a clarifier positioned within said tank, said clarifier having a wide end and a narrow end, and a plurality of substantially vertical droplines extending downwardly into said tank between said clarifier and said tank walls wherein the improvement comprises:
    a plurality of clips, each said clip comprising:
        (a) an upper wall comprising a first dropline aperture;
        (b) a lower wall comprising a second dropline aperture;
        (c) at least one sidewall extending between said upper wall and said lower wall, each said sidewall substantially perpendicular to said upper wall and said lower wall, at least one of said sidewalls is mountable to said tank wall;
    wherein said clips are mounted to said tank walls so that said upper walls of said plurality of clips are substantially horizontally positioned.

15. An aerated wastewater treatment tank according to claim 14 wherein said clip is mounted to said tank walls so that said first and second dropline apertures are substantially vertically aligned, whereby said dropline apertures may secure a dropline.

16. An aerated wastewater treatment tank according to claim 15 further comprising a stopper, said stopper configured to have a stopper dropline aperture therein, said stopper fixedly positioned on at least one of said droplines to prevent upward displacement of said droplines.

17. An aerated wastewater treatment tank according to claim 16 wherein said stopper is positioned on said dropline below said second dropline aperture.

18. An aerated wastewater treatment tank according to claim 16 wherein said stopper is positioned between said first and second dropline apertures.

19. An aerated wastewater treatment tank according to claim 16 wherein said stopper is sized so that it will not pass through said second dropline aperture.

20. An aerated wastewater treatment tank according to claim 16 wherein said clip comprises at least two sidewalls.

21. An aerated wastewater treatment tank according to claim 20 wherein said sidewalls are positioned at opposite ends of said upper wall and said lower wall.

22. An aerated wastewater treatment tank according to claim 21 wherein said upper wall contains a means for receiving tying instruments.

23. An aerated wastewater treatment tank according to claim 15 further comprising a stopper, said stopper configured to be positioned at least partially around said dropline, said stopper positioned around said drop line to prevent upward displacement of said droplines.

24. An aerated wastewater treatment tank according to claim 23 wherein said stopper is positioned between said first and second dropline apertures.

25. An aerated wastewater treatment tank according to claim 23 wherein said stopper is sized so that it will not pass through said second dropline aperture.

26. An aerated wastewater treatment tank according to claim 23 wherein said clip comprises at least two sidewalls.

27. An aerated wastewater treatment tank according to claim 26 wherein said sidewalls are positioned at opposite ends of said upper wall and said lower wall.

28. An aerated wastewater treatment tank according to claim 27 wherein said upper wall contains a means for receiving tying instruments.

29. An aerated wastewater treatment tank according to claim 23 wherein said clarifier has a lip extending from said wide end, whereby said upper walls of said clips may support said clarifier lip.

30. A method for mounting one or more droplines in an aerated wastewater treatment tank having a top, a bottom, and tank walls extending therebetween, said tank further comprising a clarifier positioned within said tank, said clarifier having a wide end and a narrow end, said clarifier having a lip extending from said wide end, a plurality of substantially vertical droplines extending downwardly into said tank between said clarifier and said tank walls, a plurality of clips, each said clip comprising an upper wall comprising a first dropline aperture; a lower wall comprising a second dropline aperture; at least one sidewall extending between said upper wall and said lower wall, each said sidewall substantially perpendicular to said upper wall and said lower wall, at least one of said sidewalls is mountable to said tank wall, said method comprising the steps of:

(a) inserting a dropline through said first and second apertures of said clip;

(b) positioning said clip; and, (c) mounting said clip to said tank wall.

31. A method according to claim 30 wherein said aerated wastewater tanks further comprises a stopper, said stopper configured to be positioned at least partially around said dropline, said stopper positioned around said drop line to prevent upward displacement of said droplines, said method further comprising the step of:

(a) positioning said stopper on said drop line so that stopper.

32. A method according to claim 31 further comprising the step of tying said dropline to said upper wall.

* * * * *